United States Patent
Matsui et al.

(10) Patent No.: US 7,346,653 B2
(45) Date of Patent: Mar. 18, 2008

(54) INFORMATION SHARING METHOD, INFORMATION SHARING DEVICE, AND INFORMATION SHARING COMPUTER PRODUCT

(75) Inventors: Kazuki Matsui, Kawasaki (JP); Masatomo Yasaki, Kawasaki (JP); Satoru Watanabe, Kawasaki (JP); Toshiaki Gomi, Kawasaki (JP); Hideto Kihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 870 days.

(21) Appl. No.: 10/355,180

(22) Filed: Jan. 31, 2003

(65) Prior Publication Data
US 2004/0006591 A1 Jan. 8, 2004

(30) Foreign Application Priority Data
Jul. 5, 2002 (JP) ............................. 2002-197733

(51) Int. Cl.
G06F 15/16 (2006.01)
G06F 1/12 (2006.01)
(52) U.S. Cl. ...................... 709/203; 709/218; 709/223; 709/232
(58) Field of Classification Search ........ 709/200–204, 709/218, 223, 232; 707/8
See application file for complete search history.

(56) References Cited

U.S. PATENT DOCUMENTS

| | | | |
|---|---|---|---|
| 5,862,325 A * | 1/1999 | Reed et al. ................ | 709/201 |
| 6,934,702 B2 * | 8/2005 | Faybishenko et al. ........ | 707/3 |
| 2002/0060281 A1 * | 5/2002 | Okazaki et al. ............. | 248/424 |
| 2002/0066026 A1 * | 5/2002 | Yau et al. ................... | 713/201 |
| 2002/0156875 A1 * | 10/2002 | Pabla ......................... | 709/220 |
| 2003/0004916 A1 * | 1/2003 | Lewis ......................... | 707/1 |
| 2003/0014759 A1 * | 1/2003 | Van Stam ................... | 725/97 |
| 2004/0243671 A9 * | 12/2004 | Needham et al. ........... | 709/204 |

FOREIGN PATENT DOCUMENTS

WO WO 02/39253 A1 * 5/2002

* cited by examiner

Primary Examiner—Zarni Maung
(74) Attorney, Agent, or Firm—Staas & Halsey LLP

(57) ABSTRACT

Simplified sharing of information among service-provision systems. A first message (Msg1) containing service information is transmitted from a first service-provision server (2a) to a first service controller (11a) [#1], wherein it is interpreted, and, for example, a second message (Msg2) is created from the service information contained in the first message (Msg1) and is transmitted to a message router (12) [#2]. The second message (Msg2) is further sent to a router controller (14) and interpreted [#3], and an action rule is determined [#4]. The action rule is executed by the message router (12), whereby the second message (Msg2) is transmitted to a second service controller (11b) [#5]. As a result, a portion of the service information contained in the second message (Mesg2) is extracted, and a third message (Msg3) is created and transmitted to a second service-provision server (2b) [#6]. The second service-provision server (2b) receives the third message (Msg3) and carries out processes corresponding to services that are provided.

10 Claims, 21 Drawing Sheets

| User ID | fujitaro |
|---|---|
| Age | 55 |
| Weight | 78kg |
| Height | 175cm |
| Ailment(s) | High blood pressure |

| User ID | hanako |
|---|---|
| Age | 40 |
| Weight | 59kg |
| Height | 163cm |
| Ailment(s) | None |

Services DB — 20

Check the box next to the service you wish to use, and click the "add" button.

☐ Grocery delivery service [Details]

☑ Health administration service [Details]

☐ Program scheduling service [Details]

☐ Crime prevention service [Details]

[Add]

*Fig.11*

Service Tray

- Portal
- Grocery Delivery
- Health Administration

Recipe Suggestion Name of Dish: Focaccia — 151

Before Revision

Recipe & Info.
- Bread flour···900g
- Sugar···pinch
- Salt···1 tsp.
- Instant yeast···1 tbsp.
- Olive oil···50ml
- Water···200ml

After Revision

Recipe & Info.
- Bread flour···400g
- Sugar···pinch
- Salt···1/2 tsp.
- Instant yeast···1 tbsp.
- Olive oil···45ml
- Water···200ml Order post-revision recipe?  [Yes]  [No]

*Fig. 15*

```
<?xml version="1.0!?>
<s:Envelope>
<s:Header></s:Header>
<s:Body>
 <m:notifyRequest>
   <m:notification m:id="5001">
   <m:from>
      <m:identityeader pp:id="20010" pp:serviceId="22" />
      <m:lifetime pp:createDay="2001/11/10" pp:limitDay="2001/12/20" />
      <m:category m:id="3001"> Recipe information </m:category>
   </m:from>
   <m:to>
    <m:originalUser pp:id="40012"> Fujitsu </m:originalUser>
   </m:to>
   <m:routing><m:timestamp>….</m:timestamp></m:routing>
   <m:contents>
    <m:humanReadable pp:cmd="add">
       <m:baseUrl m:url=http://aaa.bbb.ccc />
       <m:language m:lang="jp">
          < m:recipe><name of dish>Focaccia</name of dish>
            < ingredients bread flour="900g" sugar="pinch" salt="1 tsp."
instant yeast="1 tbsp."
                olive oil="50 ml" water="200 ml" >
          < /m:recipe >
       </m:language>
     </m:humanReadable>
    </m:contents>
   </m:notification>
  </m:notifyRequest>
 </s:Body>
</s:Envelope>
```

*Fig. 17*

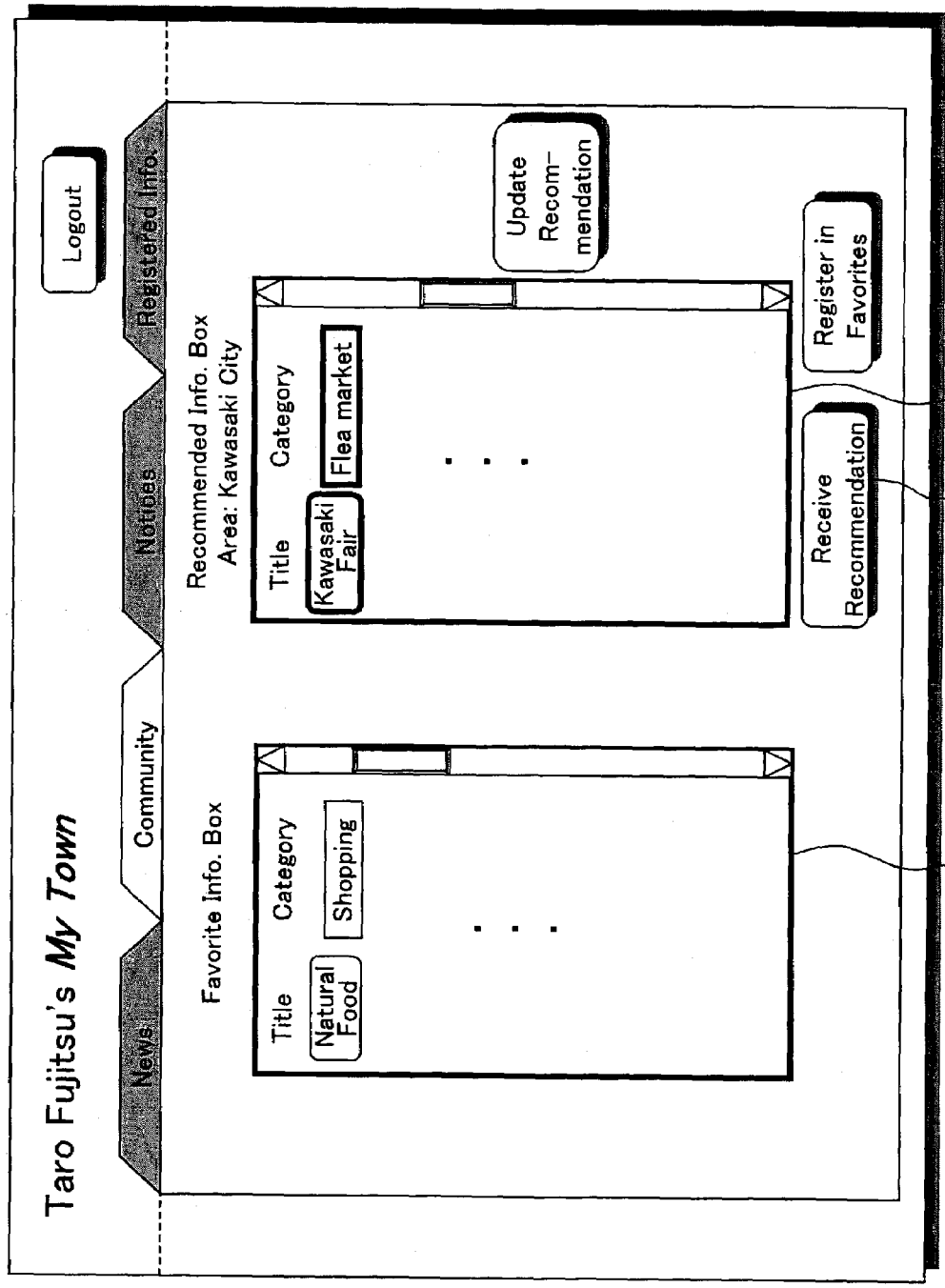

INFORMATION SHARING METHOD, INFORMATION SHARING DEVICE, AND INFORMATION SHARING COMPUTER PRODUCT

BACKGROUND OF THE INVENTION

1. Technical Field

The present invention relates to technology for providing information used on networks.

2. Description of the Related Art

Cooperation in the commitments of numerous network-based service-provision systems has lately become possible. This is because process modules that until recently had been developed independently for each service-provision system have been made into components, which has enabled using them in respective combinations. Owing to this, providing complex services by dynamically integrating numerous service-provision systems has become possible.

For example, an office worker might make travel arrangements at a company for a business trip, and the necessary travel-ticket and hotel reservations might be made automatically in accordance with what the travel arrangements entail. This could take place, for instance, by exchanging between a server for a travel agency and a server within the company messages in which reservations for transportation and lodging facilities necessary for the business trip are described in a language such as XML (extensible markup language), according to a protocol such as SOAP (simple object access protocol).

Meanwhile, in situations in which a number of service-provision systems cooperate over the Internet in their commitments, how information flowing among the service-provision systems ought to be administrated has come to be crucial. In particular, in a situation in which services are provided to a given user for whom a number of service-provision systems have made cooperative commitments, requisite information must be circulated among each of the service-provision systems, and each system must be made to share that information. On the other hand, as far as having information pertaining to users circulated among a number of service-provision systems is concerned, there will at times be such drawbacks for the users as user-private information being divulged. In short, there is a need for protecting, by a method that does not prove disadvantageous for users, personal information that flows over a network.

A method such as Microsoft™ Corp.'s ".NET My Services" is, to name one example, this sort of personal-information protection method. By this method: 1) a user's personal information is put together by a portal server; and 2) what personal information is delivered to what service-provision system is selected by the user. In this way, only personal information residing on portal servers that are trusted circulates among the service-provision systems.

Nevertheless, in situations in which messages are exchanged directly among a number of service-provision systems as mentioned above, the process modules must be designed in advance so as to enable fellow service-provision systems to cooperate. Likewise, the servers must be fitted out with process modules for judging confidence level of partner-system servers that act as message-exchange partners whenever cooperative commitments are made. The processing burden on the servers, and the development and running costs, grow consequently larger, which tends to make the price of providing the services rather high.

In situations in which personal information residing on trusted portal servers is circulated among service-provision systems, meanwhile, all users can do is select whether a portal server is trusted or not. Moreover, with this model the downside of being able to share collectively administrated user personal information among a number of service-provision systems is that there is no mechanism for sharing with other service-provision systems personal information not administrated through portal servers.

BRIEF SUMMARY OF THE INVENTION

An object of the present invention is in providing technology for sharing information in a simple manner among service-provision systems.

A different object of the present invention is in providing technology for sharing information among service-provision systems while protecting users' privacy.

A yet different object of the present invention is in providing technology for alleviating the processing burden on servers when information is shared among service-provision systems.

A still different object of the present invention is in providing technology for the flexible sharing of information among service-provision systems.

In a first aspect the present invention is an information-sharing method utilized jointly by a group of information-acquisition devices that acquire information provided by a group of information-provision devices. The information-sharing method includes: an acquisition step of acquiring, from a first information-acquisition device having acquired first information from a first information-provision device, the first information; a determination step of determining a second information-acquisition device to be a sharing destination for the first information entirely or in part; and a sharing step of transferring the first information entirely or in part to the second information-acquisition device. Therein, the first information-provision device is included among the group of information-provision devices, and the first information-acquisition device and the second information-acquisition device are included among the group of information-acquisition devices.

The information-provision devices and information-acquisition devices are furnished by information providers who provide services. The information-acquisition devices are computers on which applications operate. Examples of the applications are ActiveX™ applications, Java™ applets, or applications written in a scripting language such as VBScript™ or JavaSeript™. The information preferably is transmitted and received through messaging technology that is not platform-dependent. For example, the information may be transmitted and received as SOAP messages described in XML.

The mode of sharing information may be, to give an example, the delivery of the first information from the first information-acquisition device to the second information-acquisition device. To give another, it may also be the saving of the first information in a certain area of memory, and the second information-acquisition device using that first information. It will be appreciated that the information that is shared need not be all of the first information, but may be a part thereof. There will be instances, for example, in which in order to protect a user's privacy information will in part not be shared.

As thus in the foregoing, the second information-provision device corresponding to the second information-acquisition device may acquire the first information from the second information-acquisition device. Accordingly, the sharing of information between the first information-acquisition device and the second information-acquisition device makes it so that the first information-provision device and the second information-provision device may readily share information. Moreover, the first information-provision device leaving out a portion of the first information from what will be shared lets the privacy of the person to whom the first information belongs be protected.

The information-sharing method in the foregoing first aspect of the present invention may further include a detection step of detecting the sending of an instruction command, which instructs sharing of the first information, out from the first information-acquisition device. Therein, if an instruction command has been detected, the determination step determines a sharing rule for the first information, and determines the sharing destination in accordance with the determined sharing rule.

An example of an instruction command is a given tag within a SOAP message. The first information, interpolated in a tag that serves as an instruction command, is written in a SOAP message that is from the first information-acquisition device. This instruction command is written by either the first information-provision device or the first information-acquisition device. The sharing rule is determined according to the tag contained in the SOAP message. The sharing rule is, to be specific, written by a program. The program determines what information is to be transferred to the sharing destination, and sends out the information to the sharing destination.

In the foregoing first aspect of the invention, the information-sharing method may further include a detection step of detecting the sending of an instruction command, which instructs sharing of the first information, out from the first information-acquisition device. In this case, the determination step stores instruction commands, and sharing-rule identifiers corresponding to the instruction commands; and if any one of the instruction commands has been detected, the determination step determines a sharing rule for the first information by retrieving from among the stored sharing-rule identifiers the sharing-rule identifier that corresponds to the detected instruction command, and determines the sharing destination in accordance with the sharing rule.

The sharing-rule identifiers are addresses that indicate the file names of programs in which the sharing rules are written and where the programs are stored. By interpreting a SOAP message, and launching a program after it has been downloaded as needed, the first information is delivered to the sharing destination.

Given that the information-sharing method is characterized as just noted, the method may further include: a demand step of demanding of a computer storing the instruction commands, and the sharing-rule identifiers corresponding to the instruction command, the stored instruction commands and the stored sharing-rule identifiers; and a rule-acquisition step of acquiring from the computer the instruction commands and the sharing-rule identifiers.

The computer stores tags that become necessary for a user to use his or her favorite services, and sharing-rule identifiers that correspond to the tags. These information items are acquired from the computer when the user terminal is started up. The user terminal may as needed acquire the sharing rules, which are programs, from their addresses.

In the information-sharing method in the foregoing first aspect of the present invention, the sharing step may perform a process on, and transfer to the second information-acquisition device, the first information entirely or in part.

The process is, for example, conversion from a global address to a local address.

A process that, if the first information contains a user ID, converts the user ID into an alias user ID may be mentioned likewise.

In a second aspect the present invention is an information-sharing device utilized jointly by information-acquisition devices that acquire information provided by information-provision devices. The information-sharing device comprises: an acquisition means for acquiring, from a first information-acquisition device having acquired first information from a first information-provision device, the first information; a determination means for determining a second information-acquisition device to be a sharing destination for the first information entirely or in part; and a sharing means for transferring the first information entirely or in part to the second information-acquisition device. Therein, the first information-provision device is included among the group of information-provision devices, and the first information-acquisition device and the second information-acquisition device are included among the group of information-acquisition devices.

In a third aspect the present invention is an information-sharing computer product utilized jointly by a computer that a group of information-acquisition devices that acquire information provided by a group of information-provision devices operate. The information-sharing computer product causes the computer to function as: an acquisition means for acquiring, from a first information-acquisition device having acquired first information from a first information-provision device, the first information; a determination means for determining a second information-acquisition device to be a sharing destination for the first information entirely or in part; and a sharing means for transferring the first information entirely or in part to the second information-acquisition device. Therein, the first information-provision device is included among the group of information-provision devices, and the first information-acquisition device and the second information-acquisition device are included among the group of information-acquisition devices.

In a fourth aspect the present invention is a computer-readable recording medium on which is recorded an information-sharing program utilized jointly by a group of information-acquisition devices that acquire information provided by a group of information-provision devices. The computer-readable recording medium on which is recorded an information-sharing program is for executing: an acquisition step of acquiring from a first information-acquisition device, included among the group of information-acquisition devices, that has acquired first information from a first information-provision device included among the group of information-provision devices, the first information; a determination step of determining a second information-acquisition device, included among the group of information-acquisition devices, to be a sharing destination for the first information entirely or in part; and a sharing step of transferring the first information entirely or in part to the second information-acquisition device.

Floppy disks, hard disks, semiconductor memory, CD-ROMs, DVDs, magneto-optical disks (MOs), and other computer-read/writeable recording media may be given as examples herein.

In a fifth aspect the present invention is a user-information administration method including: a user-information storing step of correlating and storing user-by-user an identifier for an information-provision device that provides information to a user, an identifier for an information-acquisition device that acquires the information from the information-provision device, an instruction command that instructs sharing of the information, and an identifier for a sharing rule for the information; and a transmission step of transmitting, in response to a demand from a computer that any user operates, an identifier for an information-provision device, an identifier for an information-acquisition device, an instruction command, and an identifier for a sharing rule which correlate to the demand-source user.

This method is for example applied to a server to which a plurality of user terminals is connected. The server stores servers for services that are users' favorites and URLs for those servers' clients, tags, and URLs for programs that correspond to the tags. When started up, the user terminals acquire these information items. The burden on the user terminals of retaining these information items in the terminals themselves is thereby alleviated.

It should be understood that that the present invention also includes computer devices, computer programs, and computer-readable recording media on which the programs are recorded, for executing the method.

In a sixth aspect the present invention is an information acquisition method utilized by a user terminal. The information acquisition method includes: an information-acquisition step of acquiring information from an information-provision device that provides information; and an installation step of installing on the user terminal an instruction command that instructs sharing of the information, and a sharing-rule identifier that corresponds to the instruction command.

When a program for the information-acquisition device that operates as a pair with the information-provision device is downloaded, a tag and an action-rule identifier that corresponds to the tag are installed in the user terminal. The user terminal is thereby able to discern the tag that is to be detected from the information provided by the service that is used to begin with, and to tell where the sharing rule that is to be executed is stored. It should be understood that that the present invention also includes computer devices, computer programs, and computer-readable recording media on which the programs are recorded, for executing the method.

From the following detailed description in conjunction with the accompanying drawings, the foregoing and other objects, features, aspects and advantages of the present invention will become readily apparent to those skilled in the art.

BRIEF DESCRIPTION OF THE SEVERAL VIEWS OF THE DRAWINGS

FIG. 11 is an example of a screen for setting favorite services;

FIG. 15 is a screen example of a situation (display of a revised recipe) in which a service is being used on a user terminal;

FIG. 17 is an example of the header and body of a SOAP message described in XML;

FIG. 18 is a screen example of a situation (initialization screen) in which a service is being used on a user terminal;

DETAILED DESCRIPTION OF THE INVENTION

First Embodiment Example (1) Configuration (1-1) Overall Configuration

Figure 1:
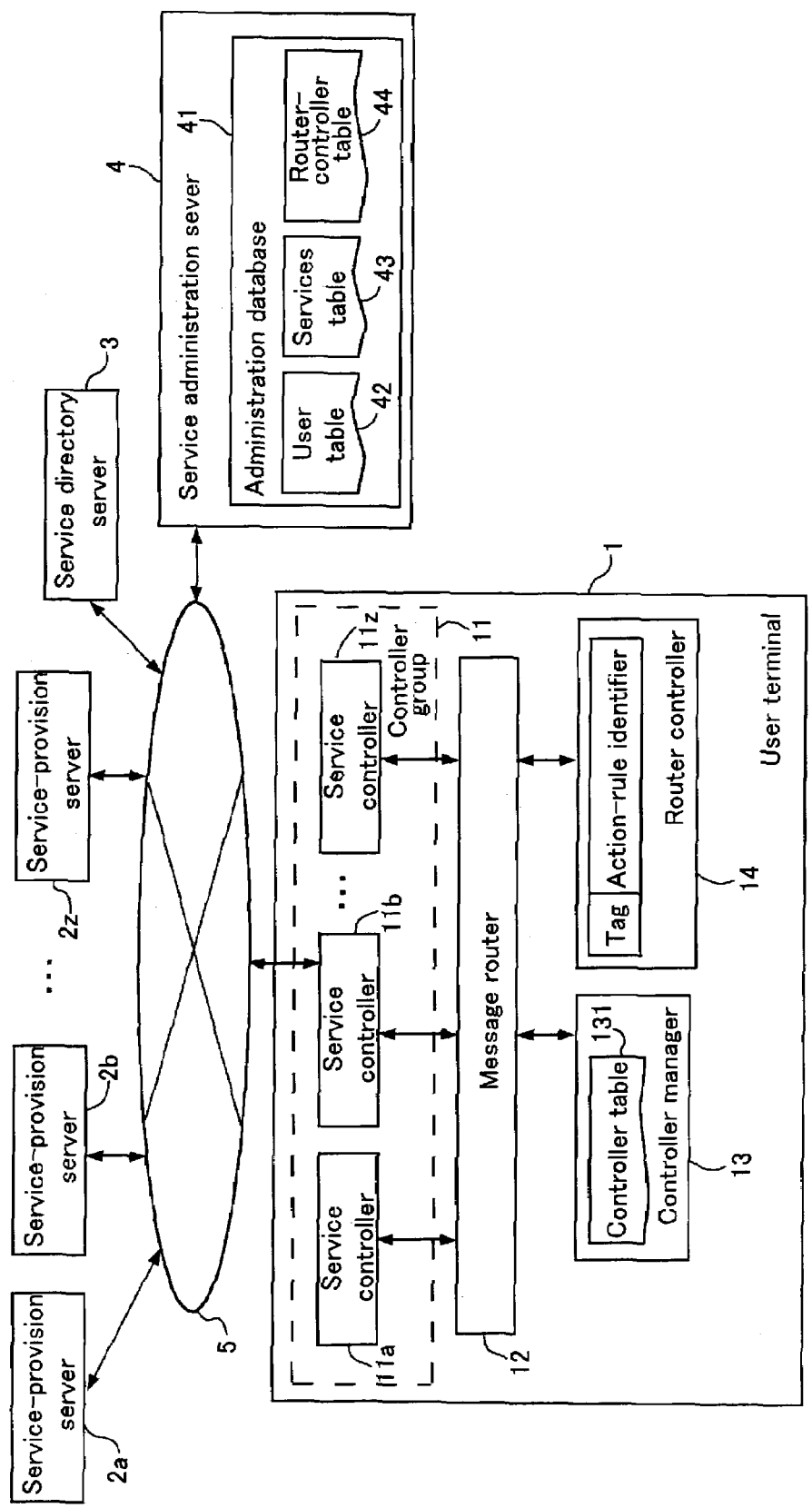
FIG. 1 is an overall configurational view of an information service system having to do with a first embodiment.

FIG. 1 is an overall configurational view of an information sharing system in which an information-sharing method under the present invention is utilized. This system includes: a user terminal(s) 1; service-provision servers 2a, 2b, . . . 2z (hereinafter at times written as "a service-provision server(s) 2" in referring to a service-provision server(s) generically); a service directory server 3; and a service-administration server 4. These terminals and servers are connected through a network 5. The network 5 is one or combination of a plurality of: the Internet; LANs including wireless LANs; or a Bluetooth™ or ECHONET network. It will be appreciated that to an ECHONET network, a (not-illustrated) gateway joined to external communications lines, such as those of the Internet, may be further connected.

The service-provision servers 2 are servers that in response to orders from the user terminal 1 transmit messages containing predetermined information. A service-provision server 2 may be, to name single examples, a Web server that transmits SOAP messages, or a household electronic appliance—such as a DVD player, a television set, a microwave range, or a refrigerator—controlled using an ECHONET network.

The service directory server 3 is a server for the user terminal 1 to search for/inquire of service-provision servers 2. The service directory server 3 is architected using, for example, UDDI (universal description discovery and integration).

The service administration sever 4 stores favorite services of the user who operates the user terminal 1, information-sharing instruction commands that are used by those services, and information-sharing rules. For example, the service-administration server 4 stores a service controller for each user terminal 1 in an administration database (DB) 41. A "service controller" is a process module that becomes necessary for using the services that the service-provision servers 2 provide. The administration DB 41 and the service controllers will be described in detail later.

The user terminal 1 is realizable by means of, for example, a personal computer (PC), a tablet PC, a mobile telephone, or a PDA. The user terminal 1 when started up accesses the service-administration server 4, and acquires addresses of service controllers for the user's favorite services, and action rules for the sharing of information among the controllers. The configuration of the user terminal 1 will be described in detail later.

(1-2) User Terminal Configuration

The user terminal 1 is equipped with at least one service controller 11a, 11b, . . . 11z (hereinafter at times written as "a service controller(s) 11" in referring to a service controller(s) generically), a messaging router 12, a controller manager 13, and a router controller 14.

The service controllers 11 correspond to the service-provision servers 2. Each service controller 11 has a service-accessory function for using a service the corresponding service-provision server 2 provides, and a sharing function for sharing user information with another service controller 11. The service-accessory function differs depending on the service controller 11. The sharing function will be explained in the following, taking service controller 11a corresponding to service-provision server 2a as an example.

The service controller 11a receives a predetermined message from the service-provision server 2a. The service controller 11a is for example prepared in JavaScript™, and is downloaded from the service-provision server 2a. On those occasions as needed the service controller 11a may be downloaded from the service-provision server 2a.

The messaging router 12 receives the message just noted from the service controller 11a and delivers the message to the router controller 14. Then following instructions from the router controller 14, information is sent to other service controllers 11b-z based on the message. What information is or is not transmitted, and further, to what service controller 11b-z information is transmitted, is determined by the router controller 14.

The controller manager 13 controls the launching and shutting down of the service controllers 11. Moreover, the controller manager 13 has a controller table 131. Stored in the controller table 131 are service-controller 11 identifiers that are programs necessary in order for the user operating the user terminal 1 to use favorite services.

The router controller 14 stores tags, and action-rule identifiers that correspond to the tags. The tags are instruction commands that instruct the sharing of information. The action rules are programs that define what information is delivered to what service controller 11. Detecting a tag within the aforementioned message, the router controller 14 launches the action rule corresponding to the detected tag. According to need, the router controller 14 may be downloaded from a server such as the service-administration server 4, or may always be present in the user terminal 1.

(1-3) Configurations of Service-Provision Server and Service Controller

Figure 2:
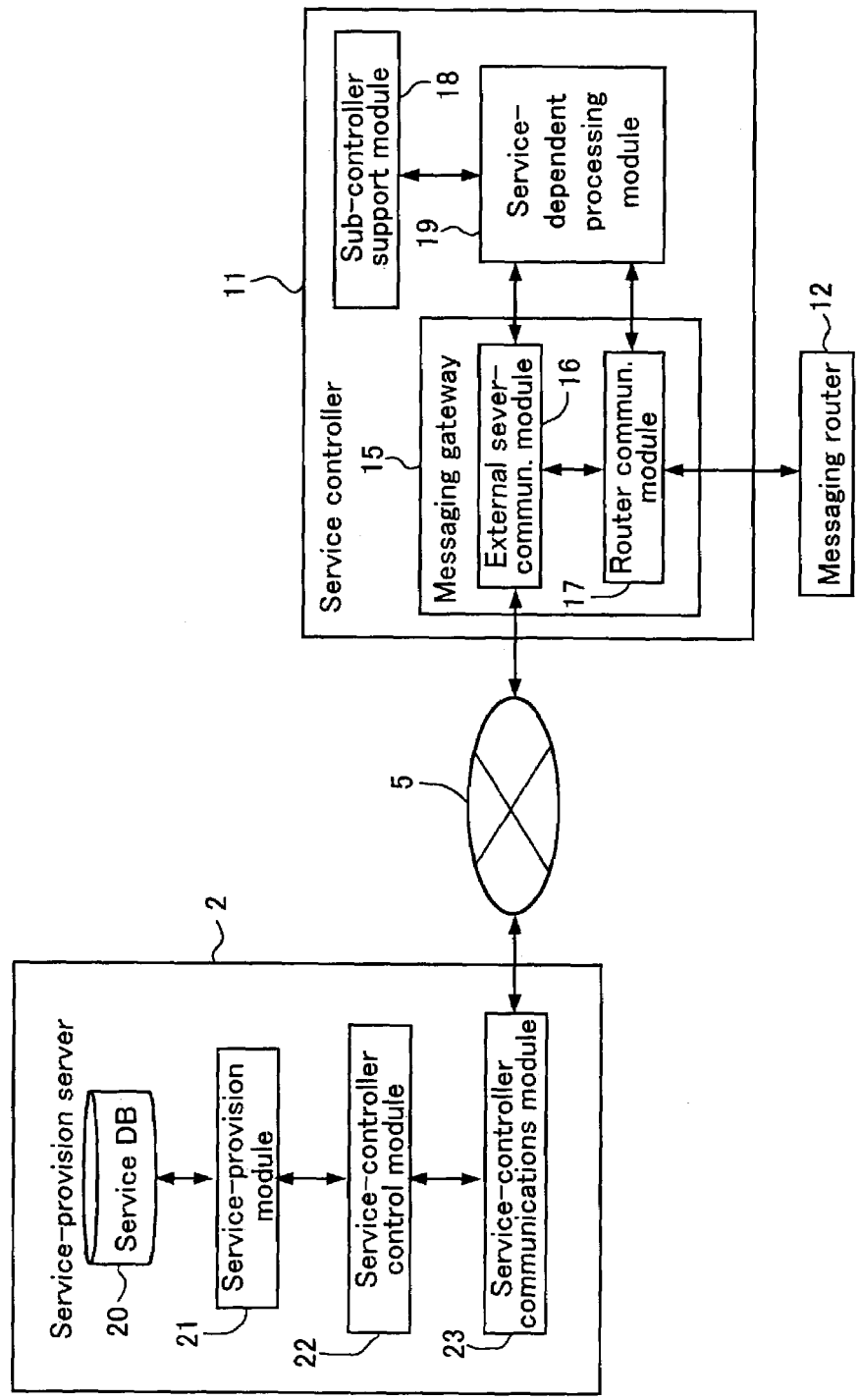
FIG. 2 is a configurational view of a service provision server and a service controller.

FIG. 2 is a detailed configurational view of a service-provision server 2 and a service controller 11. In FIG. 2, the service-provision server 2 and the service controller 11 are assumed to correspond. The service-provision server 2 is equipped with a services DB 20, a service-provision module 21, a service-controller control module 22, and a service-controller communications module 23.

To begin with, the services DB 20 will be explained. The service information stored in the services DB 20, and processes that the service-provision module 21 performs, differ depending on the service that is provided. Supposing, for example, that a service that is being provided is a grocery delivery service that receives over the Internet orders for, and makes deliveries of, groceries; then in that case the full name and address of the person placing the delivery order, and the kinds and quantities of groceries to be delivered would be stored as service information in the services DB 20.

Updating of the services DB 20 is carried out as follows. Messages from service controller 1a are received by the service-controller communications module 23 and interpreted by the service-controller control module 22. Execution of the addition/updating/deletion of information described in the message is instructed by the service-provision module 21 as a result, updating the services DB 20. The functioning of the service-controller control module 22 may be realized, in a situation in which for example the message is a SOAP message, by a SOAP listener.

Figure 3:
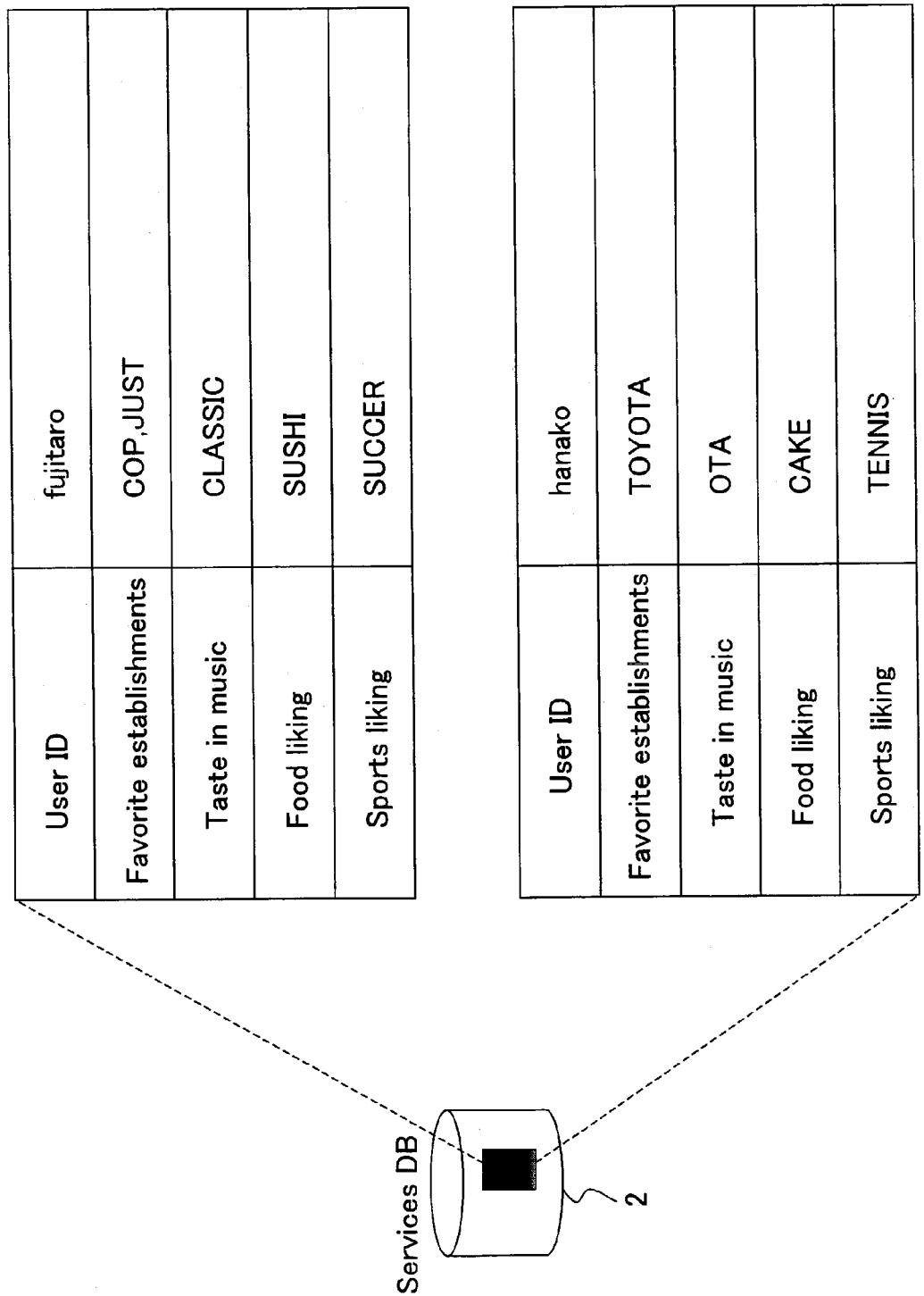
FIG. 3 is an example of preferences information stored in a services database.
Figure 4:
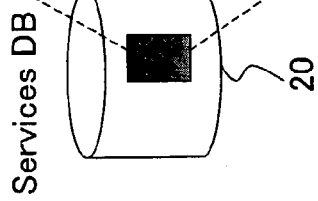
FIG. 4 is an example of health information stored in a services database.

FIGS. 3 and 4 are explanatory diagrams illustrating specific examples of service information stored in the services DB 20. The structure of the services DB 20 and the content of the service information will differ according to the service provided. For example, FIG. 3 represents service information for a service providing information that coincides with user preferences. This service information contains, in a single record, a user's ID, his or her favorite establishments, and what music, food and sports he or she likes. FIG. 4 represents service information for a health-information service that provides information, based on users' health data, helpful in maintaining users' health. This service information contains, in a single record, a user's ID, age, weight, height, and ailments.

The service controllers 11, meanwhile, are equipped with a messaging gateway 15, a sub-controller support module 18, and a service-dependent processing module 19. The messaging gateway 15 has an external sever-communications module 16 and a router communications module 17. The external sever-communications module 16 and the router communications module 17 respectively perform communications with the service-provision server 2a and the messaging router 12. The service-dependent processing module 19 carries out creation/addition/deletion of messages that become necessary for the services that the service-provision servers 2 provide. The sub-controller support module 18 senses events such as clicking on a button furnished in a window displayed on a screen.

The service controllers 11 are downloaded to the user terminal 1 as needed. Downloading the service controller 11 installs installation files required for operating the service controller 11. Included among the installation files are rule files in which are written instruction commands that service-provision servers 2 providing information to the service controllers 11 use, and sharing-rule identifiers. Under control of the controller manager 13, the instruction commands and the sharing-rule identifiers are transferred to the router controller 14, where they are stored.

(2) Overall Process Flow in Information-Sharing System

Figure 5:
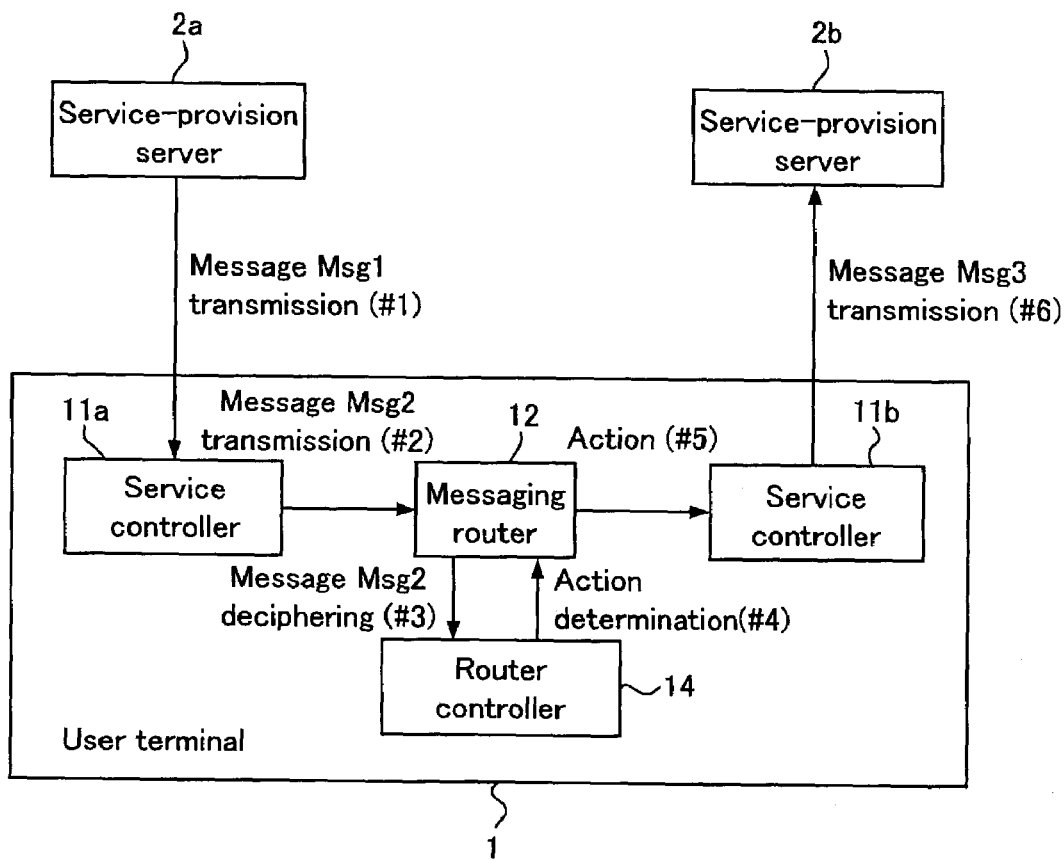
FIG. 5 is an explanatory diagram illustrating flow of an information-sharing process.

FIG. 5 is an explanatory diagram illustrating gross flow of an information-sharing process performed with the present information-sharing system. Initially a SOAP message Msg1 containing service information is transmitted from a service-provision server 2a to a service controller 11 (#1).

The SOAP message Msg1 just noted is interpreted by the service controller 11a having a SOAP listener. A predetermined process is executed by the service controller 11a as a result (#2). For example, predetermined service information contained in Msg1 is extracted, and a new message Msg2 is created and sent to the messaging router 12 (#2). Message Msg2 contains not only service information, but also tags that instruct the sharing of the service information.

Message Msg2 is sent from the messaging router 12 to the router controller 14, where it is interpreted (#3). As a result, action rules are determined by the router controller 14 (#4). The action rules are determined for example by the recognition of XML tags that are described in message Msg2.

The action rules describe information-sharing destinations, and information that is to be shared, which correlate with the tags. Depending on content of the service and properties of the information, the action rules sometimes manipulate the information. "Manipulation" is, for example, the conversion from a global address to a local address. A manipulation that converts a user ID into an alias user ID if a user ID is entered in the information that is shared could likewise be given as an example. An action rule may be, to name one example, the "displaying of a confirmation dialog box as to whether it is OK to forward message Msg2 to a service controller 11b, and forwarding of message Msg2 in accordance with the input results."

Execution of the action rule results in either a portion or all of the service information within the message Msg2 being transmitted to the service controller 11b (#5).

Message Msg2 is forwarded to and interpreted by the service controller 11b. This leads the service controller 11b to execute a process corresponding to the service. For example, a portion of service information contained in message Msg2 is extracted, and a new message Msg3 is created and transmitted to a service-provision server 2b (#6). The service-provision server 2b receives message Msg3 and carries out a process in accordance with the service being provided.

The service-provision server 2b is in this way able to share, via the messaging router 12, information from the service-provision server 2a. Accordingly, information that between the service-provision servers 2a and 2b each uses mutually can be shared facilely, and moreover, without increasing the burden on the servers. Furthermore, if personal information involving privacy is contained in a message, the sharing of such information by the service-provision server 2b can be prevented with an action rule to protect a user's privacy. Likewise, the fact that the information that fellow service-provision servers may share is irrespective of whether or not any of them is being administrated allows flexibility to be lent to the modes of sharing information.

(3) Database

Next, information stored in tables in the service-administration server 4 and user terminal 1 will be described.

First, tables in the service-administration server 4 will be described, and in what way the service-administration server 4 administrates user terminal(s) 1 favorite services will be clarified. A user table 42, a services table 43, and a router-controller table 44 are included in the administration DB 41.

(3-1) User Table (Service Administration Sever)

Figure 6:
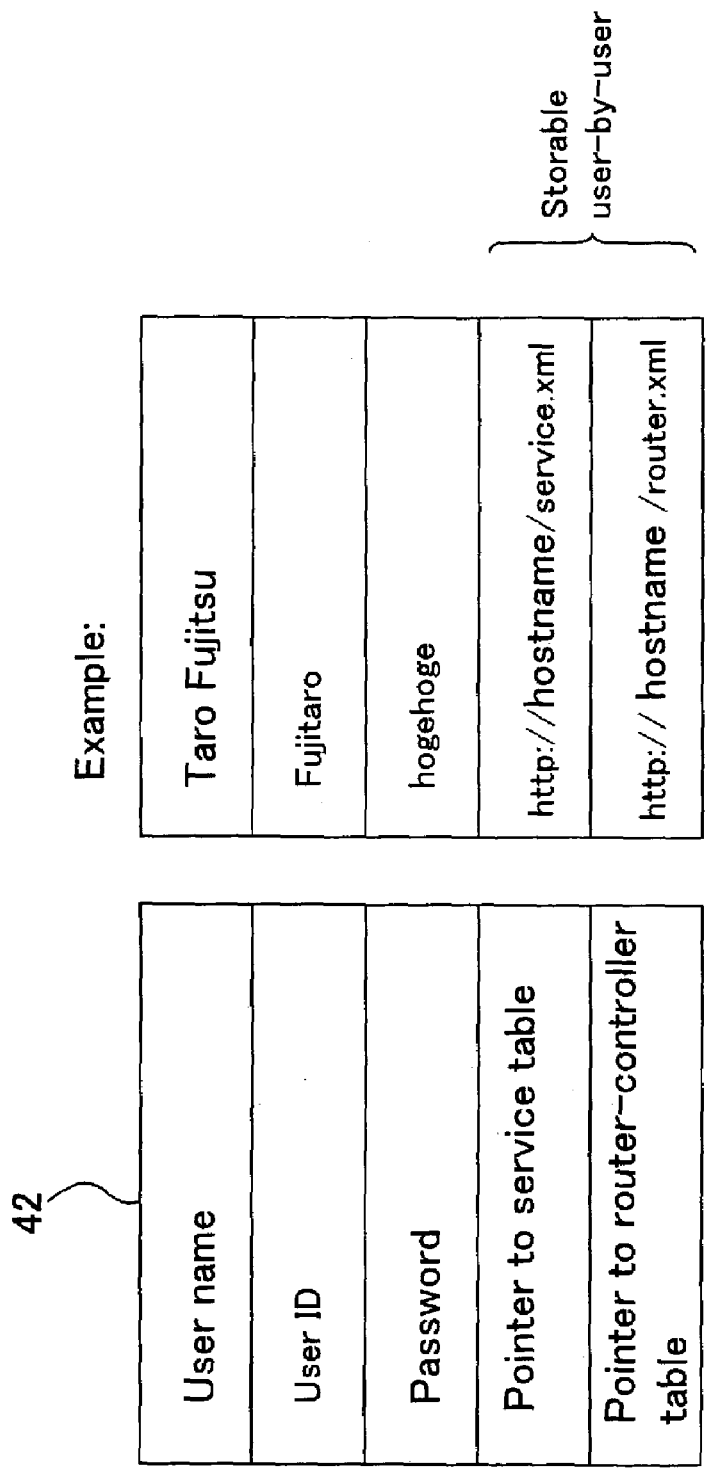
FIG. 6 is a conceptual explanatory diagram of information stored in a user table.

FIG. 6 is a conceptual explanatory diagram of user information stored in the user table 42. The user table 42 correlates: 1) users; 2) service-provision servers 2, and service controllers 11, for the users' favorite services; 3) tags; and 4) action rules. Tags herein are equivalent to instruction commands that instruct the sharing of information provided through the favorite services. Likewise, action rules are equivalent to sharing rules, and stipulate what information is to be delivered where.

Specifically, the user information contains, in a single record, a user designation, a user ID, a password, a pointer to the service table 43, and a pointer to the router-controller table 44. The "user designation" herein is the name of the user who logs into the service administration server 4 from his/her user terminal 1 and uses a provided service(s). The user ID and user password are user verification information. The pointer to the service table and pointer to the router-controller table are, for example, respective table addresses created for each user.

(3-2) Services Table (Service Administration Server)

Figure 7:
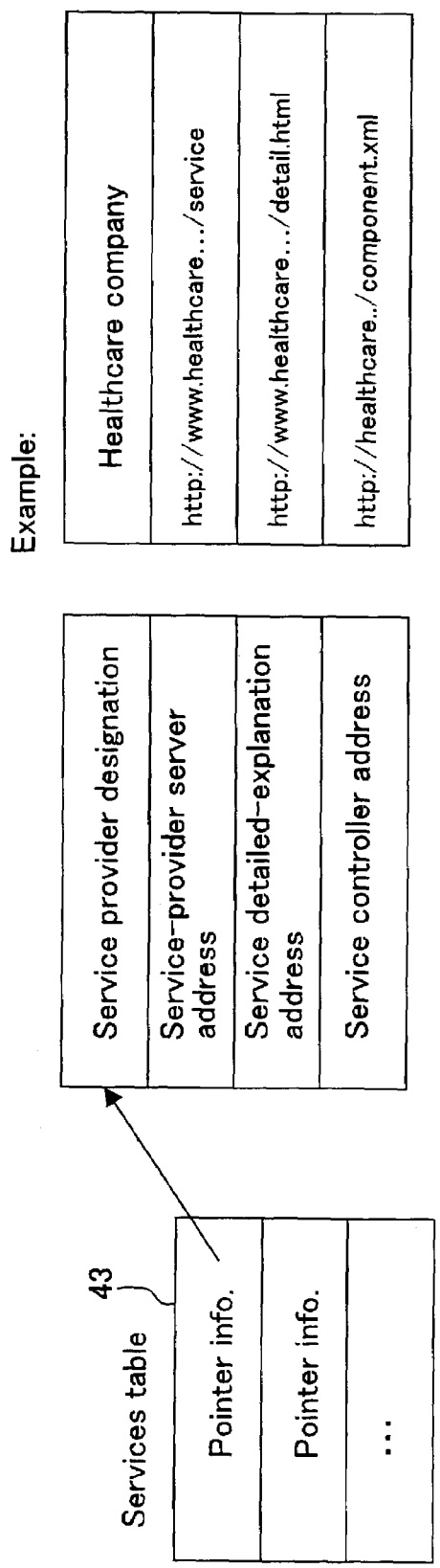
FIG. 7 is a conceptual explanatory diagram of information stored in a services table.

FIG. 7 is a conceptual explanatory diagram of services-administration information stored in the services table 43. The services table 43 stores service-provision-server 2 and service-controller 11 identifiers for users' favorite services.

In a single record the services-administration information contains, for example, a service provider designation, a service-provision server address, a service detailed-explanation address, and a service controller address. The "service provider designation" herein is the title of a principal that provides a service utilizing a service-provision server 2. The "service-provision server address" is for example a URL (uniform resource locator) for a service-provision server 2. The "service detailed-explanation address" is for example the URL for a Web page on which the content of services provided through a service-provision server 2 is explained in detail. The "service controller address" is a URL where a program—a Java™ applet for example—defining operations by the service controller 11 is stored. Favorite services can by user instruction be added to or deleted from storage in the services table 43 (later-described FIG. 11).

(3-3) Router-Controller Table (Service Administration Server)

Figure 8:
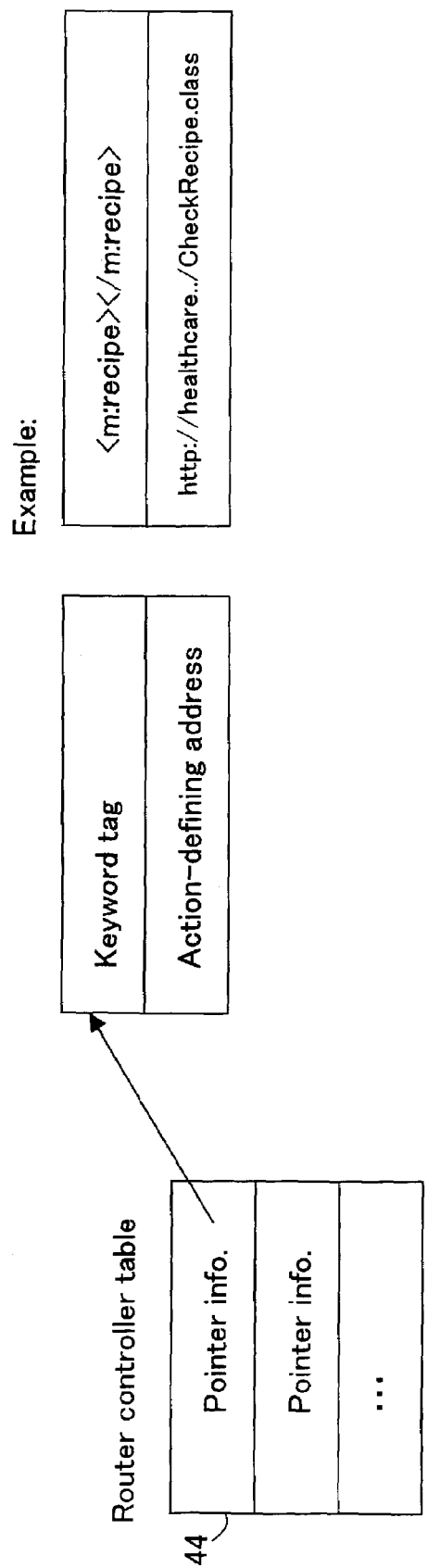
FIG. 8 is a conceptual explanatory diagram of information stored in a router controller table.

FIG. 8 is a conceptual explanatory diagram of action information stored in the router controller table 44. The router controller table 44 stores tags by which users' favorite services instruct the sharing of information, and action-rule identifiers.

Specifically, the action information contains a keyword tag and an action-rule address in a single record. A "keyword tag" herein is a tag that by being detected by the router controller 14 triggers the sharing of information. An "action-rule address" is the storage address of an action rule that is executed when a keyword tag has been detected. An action rule is a program such as a Java™ applet, for example.

(3-4) Controller Table (User Terminal)

Next, the controller table 131, which the user terminal 1 includes, will be explained. Storage addresses of the service controllers 11 for users' favorite services are stored in the controller table 131. The addresses are acquired from the administration DB 41 for the service administration server 4 when the user terminal 1 is started up. Furthermore, the addresses are added in when the user terminal 1 configures anew settings for favorite services.

Figure 9:
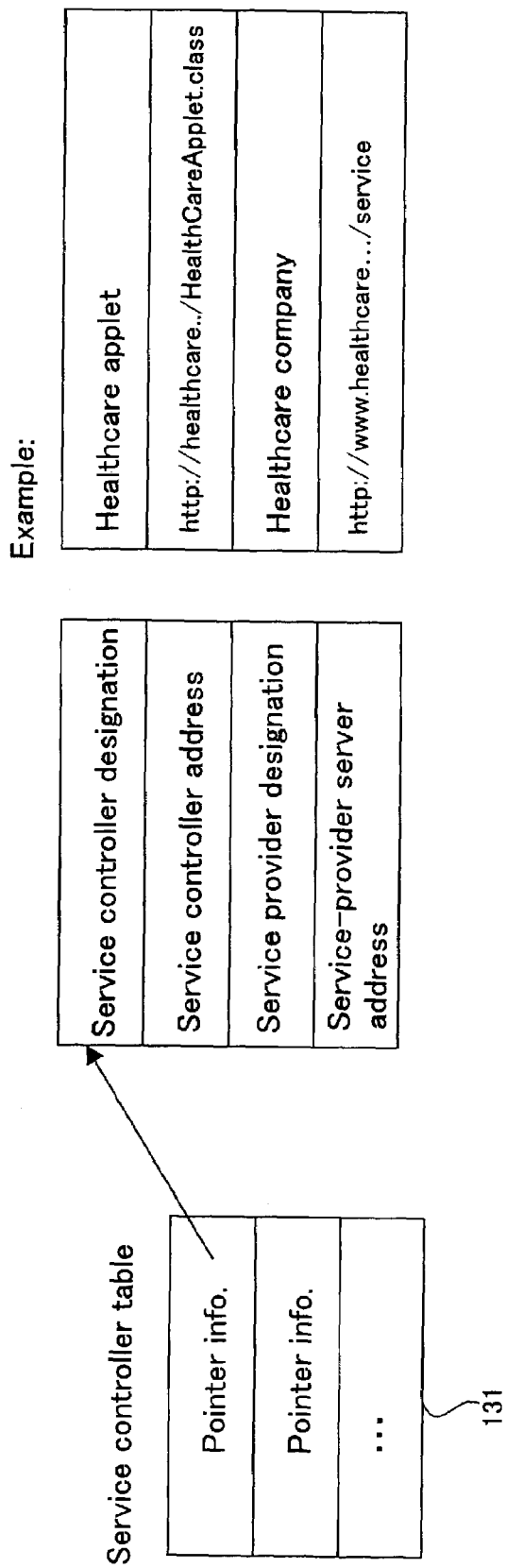
FIG. 9 is a conceptual explanatory diagram of information stored in a controller table.

FIG. 9 is an explanatory diagram illustrating an example of service-controller information stored in the controller table 131. The service-controller information contains, for example, a service controller designation, a service controller address, a service provider designation, and a service-provider server address, in a single record. The "service controller designation" herein is, given that the service controller is for example a Java™ applet, the applet name. The "service controller address" is for example a URL where the Java™ applet that is a service controller is stored. The service provider designation and service-provider server address are likewise as described earlier.

(4) Process Flow

The flow of processes performed through an information-sharing system having to do with the present embodiment example will be explained below.

(4-1) Initial Settings Process

Figure 10:
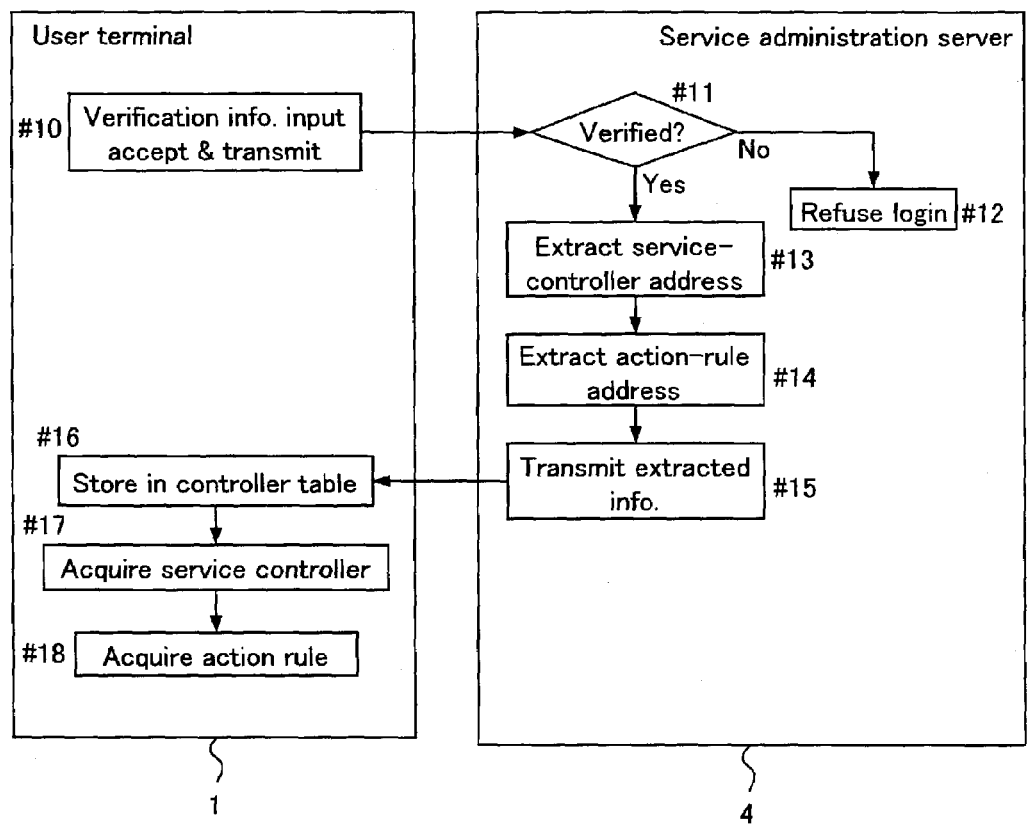
FIG. 10 is an explanatory diagram illustrating flow of an initial settings process.
Figure 12:
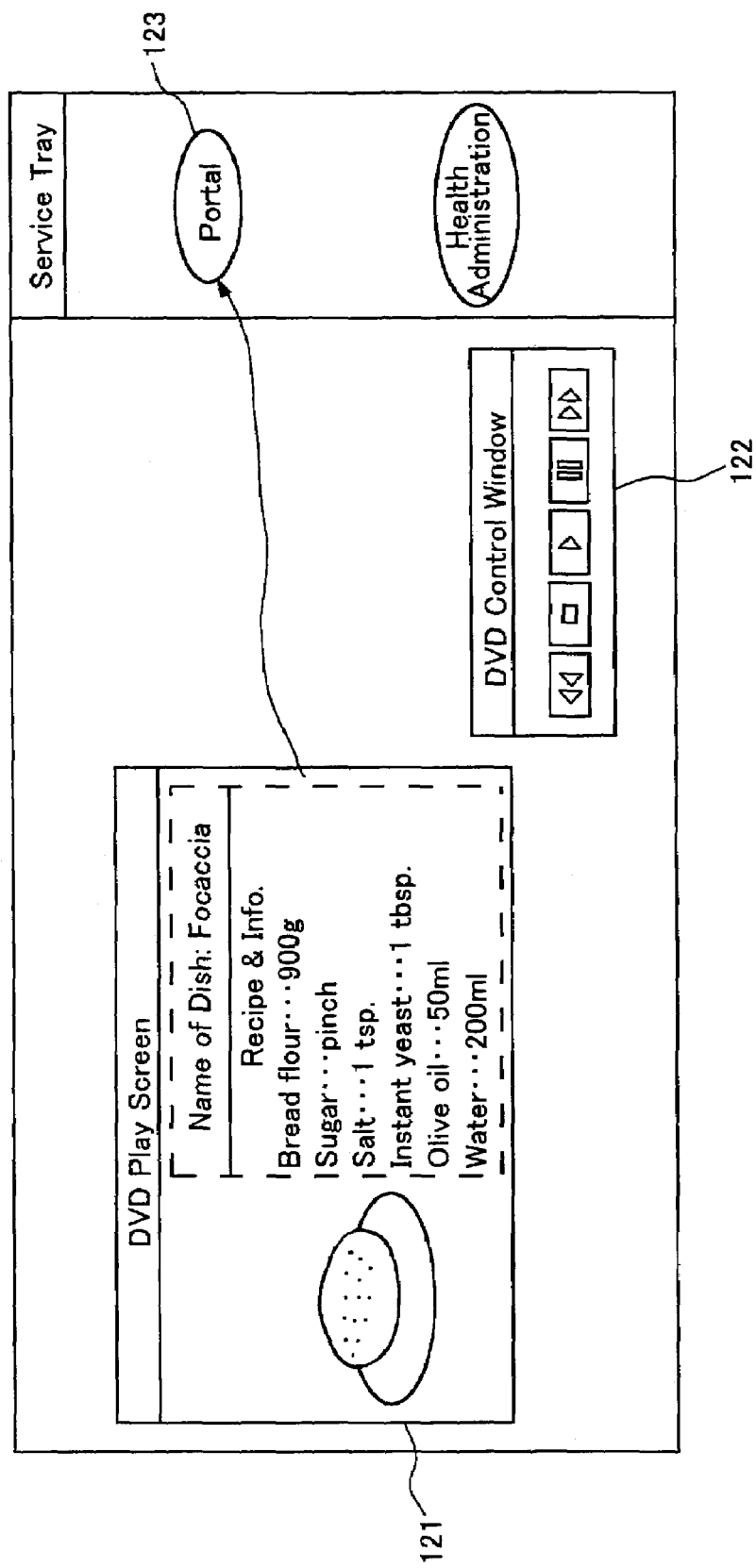
FIG. 12 is a screen example of a situation (ordering a delivery of groceries) in which a service is being used on a user terminal.
Figure 13:
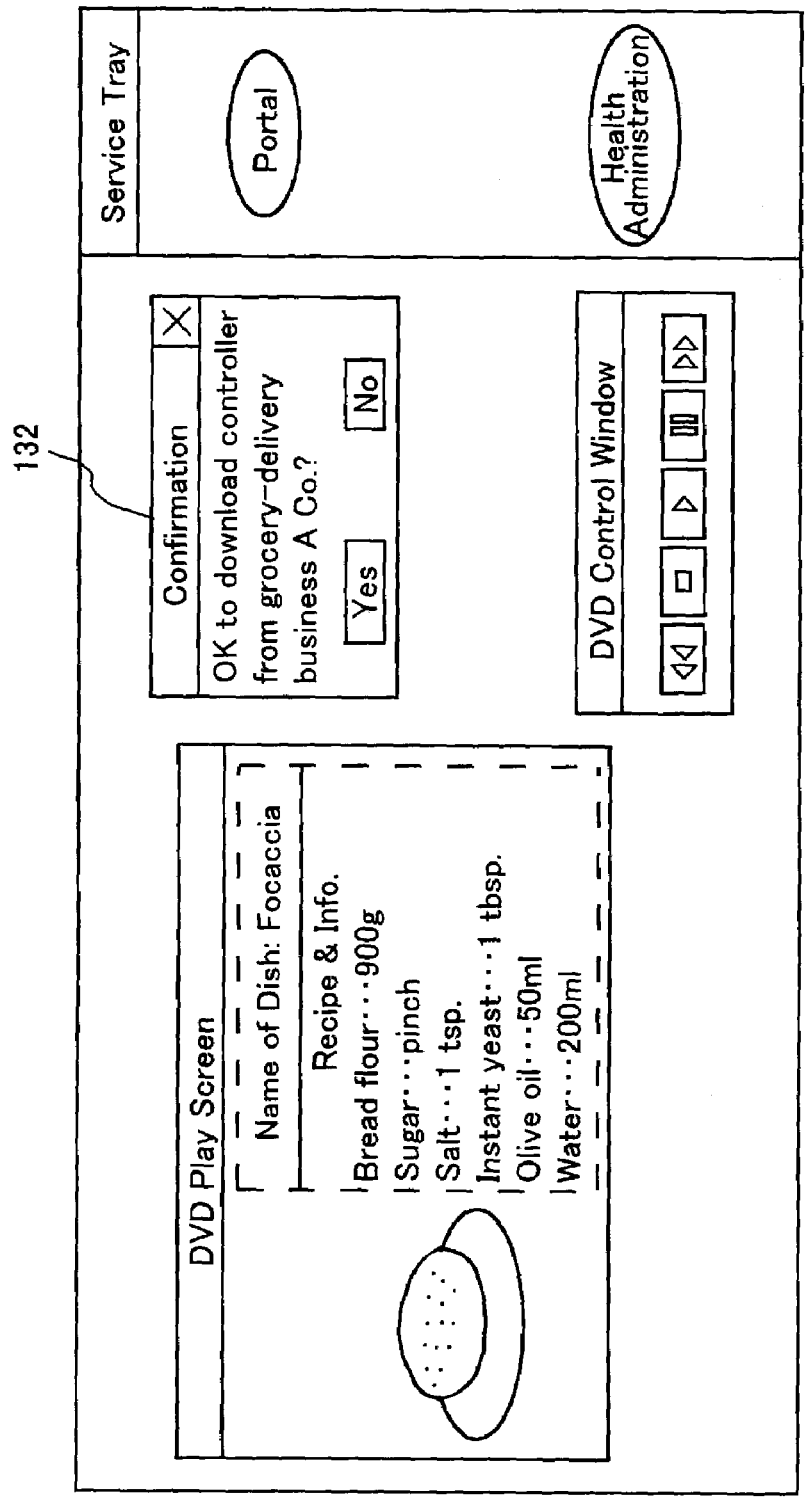
FIG. 13 is a screen example of a situation (confirming the downloading of a grocery delivery controller) in which a service is being used on a user terminal.

FIG. 10 is an explanatory diagram illustrating flow of an initial settings process performed through the user terminal 1 and the service administration server 4. Through this process, the user terminal 1 after being started up acquires information necessary for using the user's favorite services.

The user terminal 1 accepts, on a screen displayed by a Web browser (not illustrated) or the like, input of verification information, and transmits its user ID and password to the service administration server 4 (#10).

The service administration server 4 judges whether or not the received user ID and password match any of the user IDs and passwords that are stored in the user table 42 (#11). If they match, login of the user terminal 1 is verified; if they do not match, login is refused (#12).

Based on the verified user ID, the service administration server 4 extracts from the service table 43 the addresses of the service-provision server 2, and of its service controller 11, for a favorite service of the user's (#13). Likewise, the service administration server 4, based on the verified user ID, extracts from the router controller table 44 the tag used by the user's favorite service, and the address of the corresponding action rule (#14). The extracted information is transmitted to the user terminal 1 (#15).

The user terminal 1 stores the addresses for the service-provision server 2 and the service controller 11 in the controller table 131 (#16). Likewise, the tag and the address for the action rule are stored in the router controller 14. The user terminal 1 accesses the address of the service controller 11, and acquires from the service-provision server 2, by downloading for example, the service controller 11 needed for using the service (#17). Furthermore, the user terminal 1 accesses the action-rule address and acquires the action rule by for example downloading it from a service-provision server 2 (#18). Acquisition of the service controller 11 and the action rule may be carried out according to necessity.

(4-2) Information-Sharing Process

With reference to FIG. 5 and FIGS. 11 through 16, based on screen examples an instance of an information-sharing process in the present embodiment will be explained below.

FIGS. 11 through 16 are one example of screen transitions on the user terminal 1 in the information-sharing process. An instance in which recipe information that is the user's private information is shared between a service-provision server 2y (referred to as "grocery delivery server 2y" below) and a service-provision server 2z (referred to as "health administration server 2z" below) will be illustrated as an example.

The grocery delivery server 2y provides a grocery delivery service. The health administration server 2z provides a health administration service. The user watches on the user terminal 1 a cooking program displayed on a DVD play screen. The DVD play screen is provided by a service-provision server 2x that is a DVD player (referred to simply as "DVD player 2x" below). The user places an order with the grocery delivery service for a delivery of groceries needed in the recipe for a dish shown. In this instance, the health administration server 2z, obtaining the user's consent, acquires the recipe information and makes revisions to the recipe information so as to suit the user's state of health.

FIG. 11 illustrates an example of a favorite-services-setting screen that the service administration server 4 provides to the user terminal 1. Selecting for example a health administration service on the favorite-services-setting screen adds that service to the favorites. Specifically, a service controller 11z (health administration controller 11z) corresponding to the health administration service is downloaded from the health administration server 2z to the user terminal 1. Likewise, along with predetermined installation files, a tag that instructs the sharing of information provided through the health administration service, and an action rule, are installed. The tag and action rule are stored in the router controller 14. Subsequently, the health administration controller 11z sends a registered message to the controller manager 13, and has it registered in the controller table 131. Through this screen deletion of the favorite service is also possible.

Next, the user terminal 1, utilizing a service controller 11x (referred to as DVD controller 11x) that corresponds to the DVD player 2x, demands of the DVD player 2x cooking-program video information that contains the recipe information for the dish. The recipe information is embedded, in XML form for example, within the cooking program data. The DVD controller 11x interprets the recipe message Msg1 from the DVD player 2x, and plays the cooking-program video in a DVD play-screen window 121 illustrated exemplarily in FIG. 12. This video can be played, paused, etc. by clicking buttons in a DVD operating window 122.

Herein it is supposed that, in the situation in which the recipe for the dish is being displayed, the "Pause" button has been clicked, and the recipe information present on the right side of the user terminal 1 screen is being drag-and-dropped into a "portal service tray" 123. "The portal service tray" 123 is for example a GUI that is administrated by the controller manager 13. When "the portal service tray" 123 senses the drag-and-dropping of the recipe information, the recipe information is transferred from the DVD controller 11x to the messaging router 12 (#2). The recipe information at that time is transferred as a recipe message Msg2 described in XML, for example. FIG. 17 is one specific example of the recipe message Msg2.

From the messaging router 12 the recipe message Msg2 is further transferred to the router controller 14 (#3). Based on a tag within the recipe message Msg2, the router controller 14 determines an action rule for the sharing of the recipe information (#4). For example, when the router controller 14 detects the tag <m: recipe> from the recipe message Msg2 illustrated by way of example in FIG. 17, it determines the action-rule use that corresponds to the tag. The action rule may be, to give one example, "Forward recipe information to a service controller 11y" (referred to as grocery delivery controller 11y below) "corresponding to grocery delivery server 2y."

Figure 14:
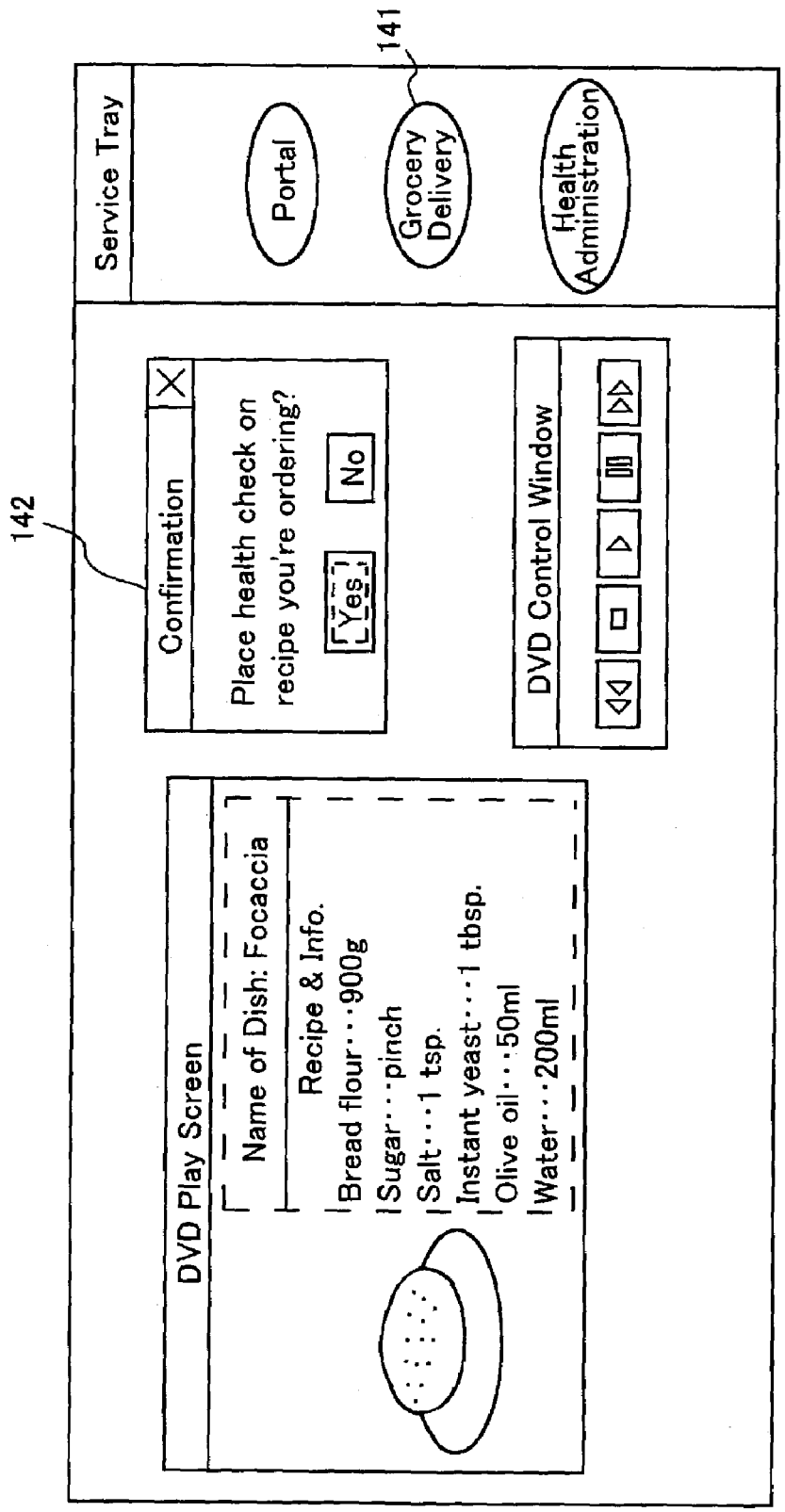
FIG. 14 is a screen example of a situation (confirming the provision of information to a health administration service) in which a service is being used on a user terminal.

After determining the action rule, the router controller 14 inquires of the controller manager 13 whether or not the grocery delivery controller 11y already exists on the user terminal 1. The controller manager 13 consults the controller table 131 and notifies the router controller 14 of the presence/absence of the grocery delivery controller 11y. In case the grocery delivery controller 11y that is to be the forwarding destination for the recipe information does not exist on the user terminal 1, the router controller 14 displays a "confirmation window" 132, illustrated exemplarily in FIG. 13. The confirmation window checks with the user whether or not it is OK to download the grocery delivery controller 11y from the grocery delivery server 2y. If "Yes" in this window is clicked, the grocery delivery controller 11y is downloaded to the user terminal 1, and a "grocery delivery service tray" 141, illustrated by way of example in FIG. 14, is added.

After the grocery delivery controller 11y has been downloaded, the recipe information within the recipe message Msg2 is transferred from the messaging router 12 to the grocery delivery controller 11y (#5). The recipe information is embedded by the grocery delivery controller 11y in, for example, a revised request message Msg2 that is an XML document. The revised request message Msg2 contains for example the description, "Ask a health administration server 2z to revise recipe so as to suit user's state of health." The revised request message Msg2 that contains the recipe information is transferred from the grocery delivery controller 11y to the router controller 14, where it is interpreted (#3). Action rule "Forward to a health administration controller 11z upon user's consent" is determined as a result (#4). In accordance with the action rule, the router controller 14 displays a confirmation window 142, exemplarily illustrated in FIG. 14.

The window 142 confirms with the user whether or not it is OK to forward the recipe information to the health administration server 2z. If "Yes" in this window is clicked, the recipe information is transferred from the messaging router 12 to the health administration controller 11z (#5). Subsequently, the recipe information is interpreted by the health administration controller 11z. The interpretation result—for example, a revision-request message Msg3 that asks for revision of the recipe information—is transmitted from the health administration controller 11z to the health administration server 2z (#6).

The recipe information transmitted by means of the revision-request message Msg3 is revised by the health administration server 2z, and a "revision-complete" message Msg1 that contains the post-revision recipe information is transmitted to the health administration controller 11z (#1). The "revision-complete" message Msg1 additionally is transferred via the messaging router 12 to the router controller 14 (#2). Subsequently, tag information contained in the "revision-complete" message Msg1 is interpreted, and an action rule is determined, according to which a recipe confirmation window 151, illustrated exemplarily in FIG. 15, is displayed (#4). The window 151 displays pre-revision recipe information and post-revision recipe information, and confirms with the user whether or not to place an order for a delivery of the ingredients according to the post-revision recipe. If through the window 151 "Yes" is clicked, the post-revision recipe information is transmitted to the grocery delivery controller 11y (#5). Based on the post-revision recipe information, an order message Msg3, to which is appended information such as user-identifying data required for the grocery delivery, is transmitted from the grocery delivery controller 11y to the grocery delivery server 2y (#6).

Figure 16:
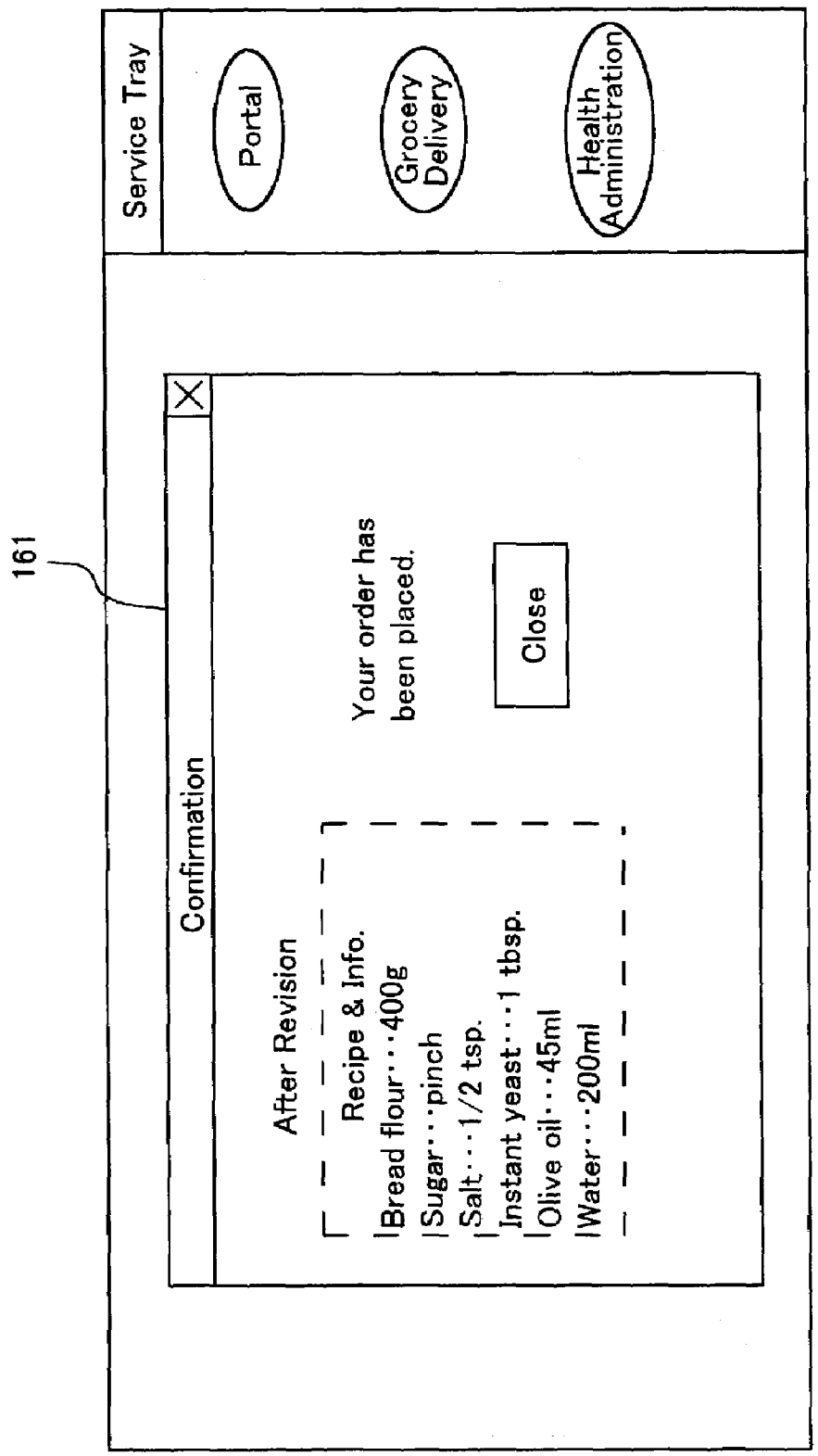
FIG. 16 is a screen example of a situation (completion of a grocery delivery order) in which a service is being used on a user terminal.

A confirmation window 161, illustrated by way of example in FIG. 16, to the effect that the order has been completed is then displayed.

The grocery delivery server 2y and the health administration server 2z in this way can, via the messaging router 12, facilely share the recipe information without being greatly burdened. Moreover, the user's privacy can be protected inasmuch as the user's prior consent in sharing the recipe information is obtained. Using the action rules to restrict the information that is shared also makes protecting privacy possible. The fact that the information that the grocery delivery server 2y and the health administration server 2z share is irrespective of whether either of them is being administrated allows flexibility to be lent to the mode of sharing information.

Second Embodiment

The information-sharing process under the foregoing first embodiment can be utilized by information-provision services other than those therein. Setting forth as an example an information-sharing process between a favorite information-provision server 2g and a recommended information-provision server 2h, the present invention in a second embodiment will be explained. The favorite information-provision server 2g provides services that enable registration and browsing of information coinciding with user preferences. These services are usable by means of the favorite controller 11g. The recommended information-provision server 2h provides a service that allows recommended information in a certain area of user interest to be browsed. This service is usable by means of a recommended controller 11h.

User preferences information (see aforementioned FIG. 3) held by the favorite information-provision server 2g is provided, under user's consent, to the recommended information-provision server 2h by the information-sharing process in the present embodiment. This accordingly enables recommended information matched to a user's preferences to be provided to the user while the user's privacy is appropriately protected.

Screen Examples from Information-Sharing Process

An information-sharing process in the present embodiment will be explained below, with reference to FIG. 5 and FIGS. 18 through 22.

FIG. 18 depicts a screen example on the user terminal 1. A "Favorite Information Box" 181 from a favorite information service and a "Recommended Information Box" 182 from a recommended information service are displayed side by side on this screen. If for example the sharing of information between a "favorite information service" and a "recommended information service" has been selected by the user, this screen is prepared by the user terminal 1. The screen is otherwise furnished by the respective servers 2g and 2h.

Figure 19:
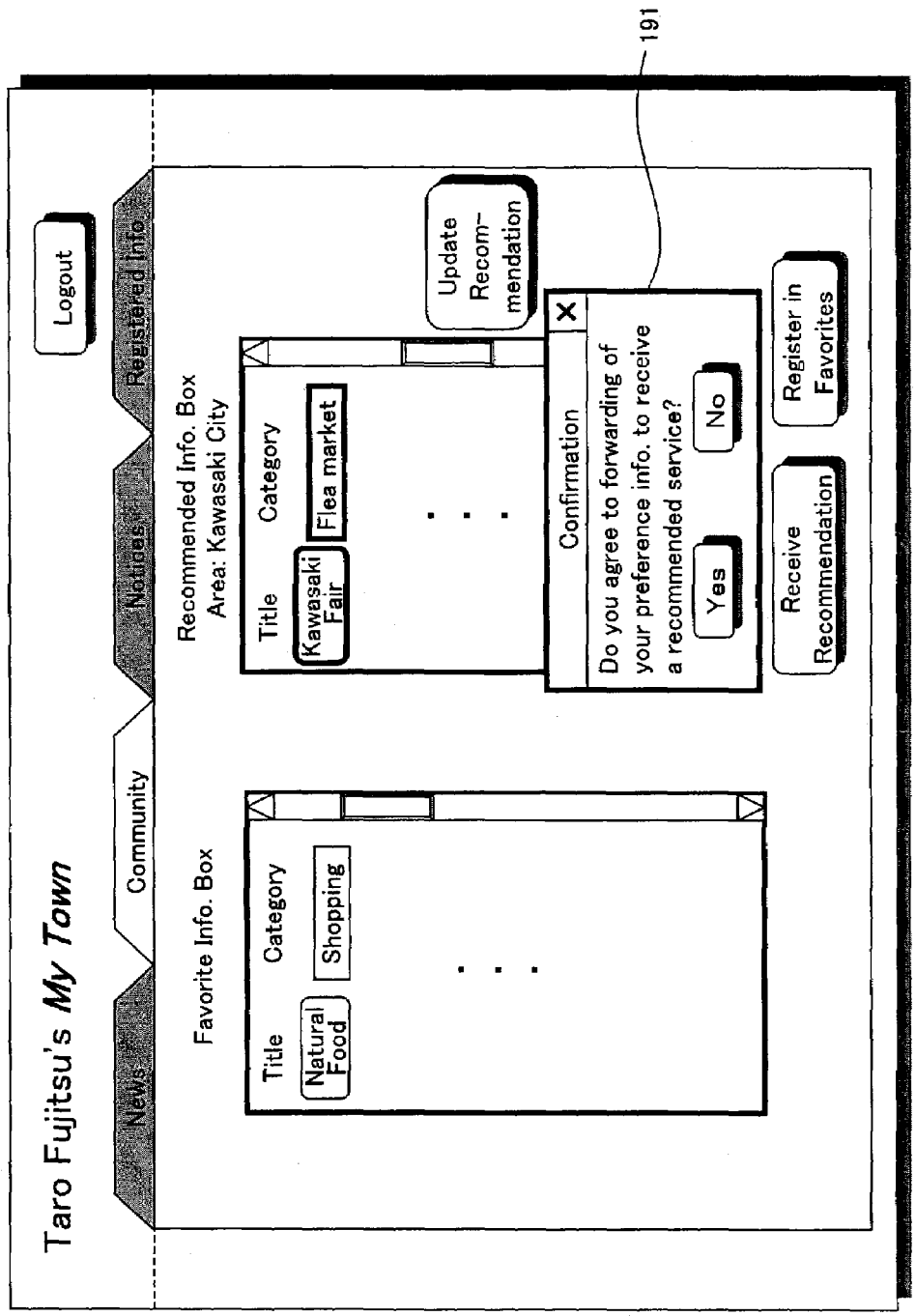
FIG. 19 is a screen example of a situation (confirming the provision of information to a recommended information service) in which a service is being used on a user terminal.

At first, when a "Receive Recommendation button" 183 within the screen in FIG. 18 is clicked, the favorite controller 11g demands of the router controller 14 the transmission of preferences information. In response to this demand, a confirmation window 191 illustrated exemplarily in FIG. 19 is displayed by the router controller 14. The confirmation window 191 confirms whether or not it is OK to forward the preferences information from the favorite information-provision server 2g to the recommended information-provision server 2h. If "Yes" is clicked, a preferences message Msg1 containing the preferences information is transmitted from the favorite information-provision server 2g to the favorite controller 2g (#1). The preferences information is turned into a preferences message Msg2 and is transmitted from the favorite controller 2g to the router controller 14 (#2, #3). The router controller 14 interprets the preferences information within preferences message Msg2 to determine an action rule (#4). The action rule "preferences-information sending destination is recommended controller 11h" is for example determined (#4). The preferences information is extracted, based on the action rule, by the router controller 14, and is transmitted from the messaging router 12 by way of the recommended controller 11h (#5) to the recommended information-provision server 2h (#6).

Based on the transmitted preferences information, the recommended information-provision server 2h extracts from the services DB 20 recommended information most suited to the user's preferences. The recommended information extracted is transmitted as a recommendation message Msg1 to the recommended controller 11h (#1). Based on the recommended message Msg1, the recommended controller 11h displays the recommended information.

Figure 20:
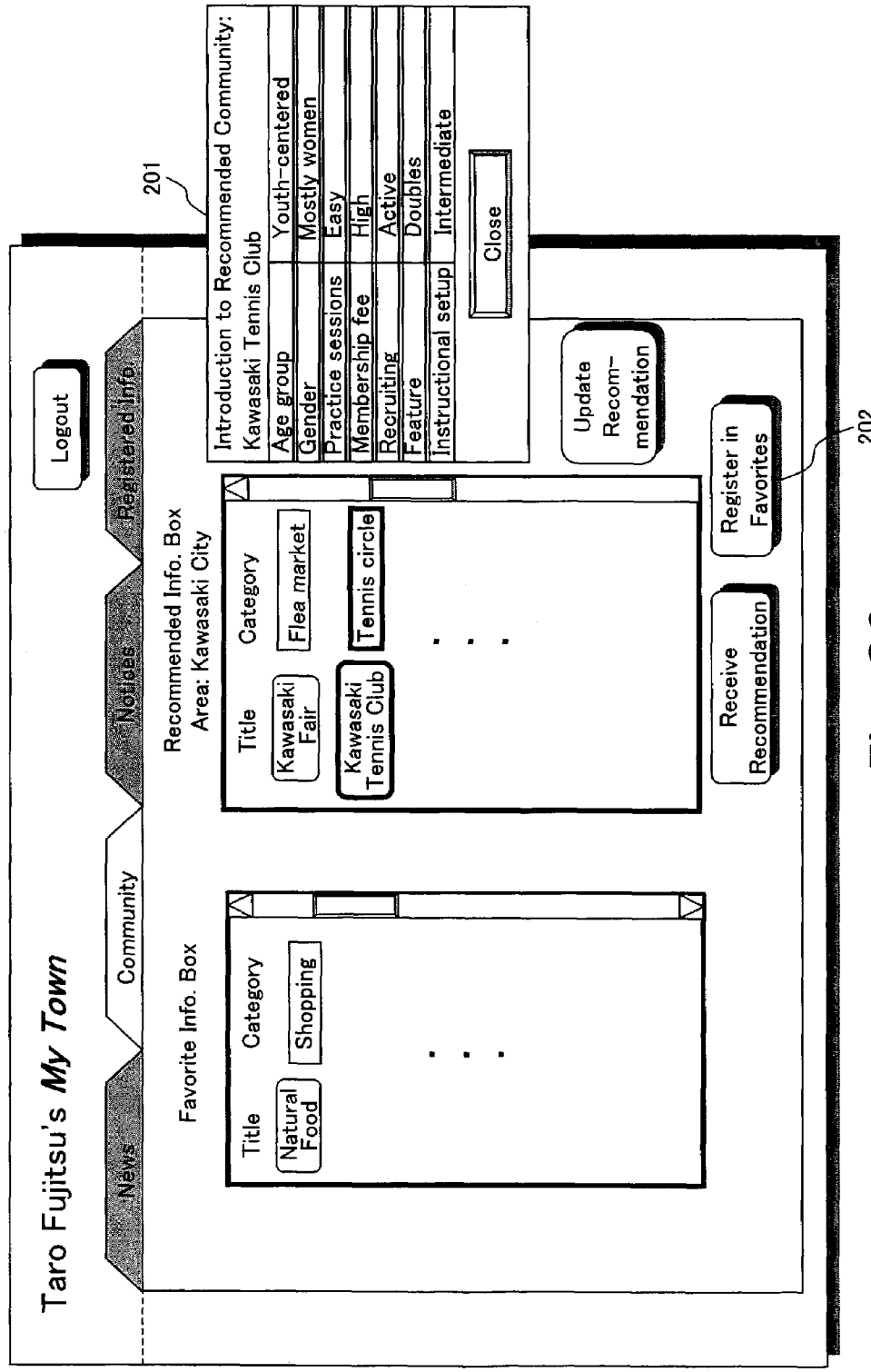
FIG. 20 is a screen example of a situation (display of recommended information) in which a service is being used on a user terminal.

FIG. 20 is an example of a recommended-information display that is based on the recommendation message Msg1. The title "Kawasaki Tennis Club," and the content "tennis circle," are highlighted within the "Recommended Information Box." At the same time, detailed information concerning the "Kawasaki Tennis Club" is displayed in an "Introduction to Recommended Community" window 201. Herein, if a "Register in Favorites button" 202 is clicked, a recommended message Msg2 that contains recommended information is transferred from the recommended controller 11h to the messaging router 12. The recommended information is information pertaining to the "Kawasaki Tennis Club" currently highlighted in the "Recommended Information Box."

Figure 21:
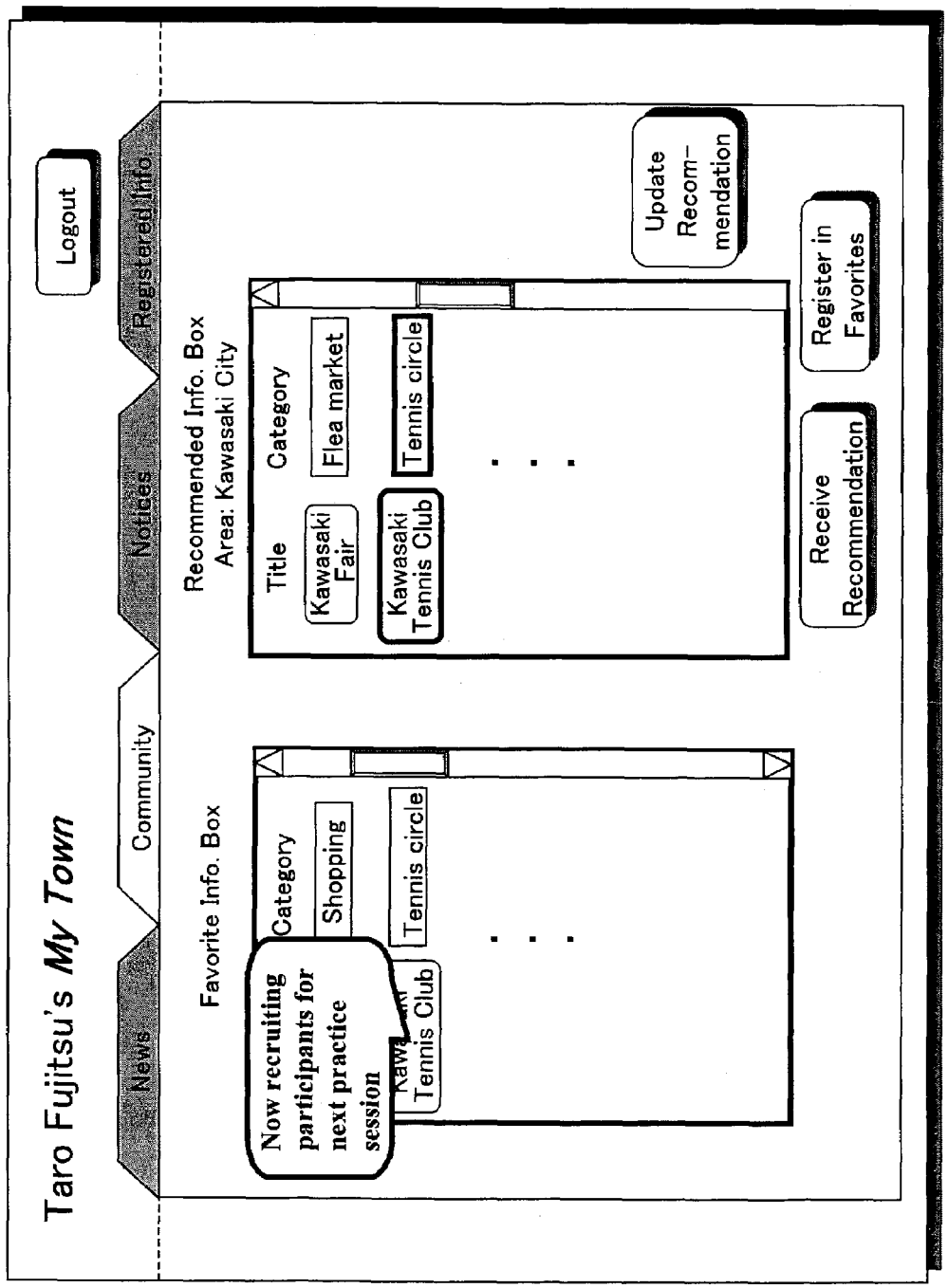
FIG. 21 is a screen example of a situation (display of information provision to a favorite information service) in which a service is being used on a user terminal.

The router controller 14 interprets the recommended message Msg2 (#3) to determine an action rule (#4). The action rule "transfer recommended-information message to favorite controller 11g" is for example determined. In accordance with the action rule, the recommended information is transferred from the messaging router 12 to the favorite controller 11g (#5). The recommended information, together with an ID for the user, further is transmitted as a recommended-information message Msg3 from the favorite controller 11g to the favorite information-provision server 2g (#6). The recommended information transmitted is added into information on the user's favorites, which is identified by the transmitted user ID. Here, favorites information for each user is stored in the favorite information-provision server 2g. FIG. 21 represents a screen example in which the added-in recommended information is displayed in the "Favorite Information Box" as favorite information.

As thus in the foregoing, even though the favorite information-provision server 2g and the recommended information-provision server 2h share information flexibly, because the user's prior consent in sharing the information is obtained the user's privacy can be protected. Moreover, the burden on the servers owing to information sharing can be controlled to a minimum.

Other Embodiment Examples

An information-sharing method under the present invention can be suitably utilized irrespective of the type of service-provision server and service controller. The action rules are configured to suit, based on the information provided by service-provision servers, and on what the services that use the information are.

Computer-readable recording media on which are recorded programs that execute the afore-described methods under the present invention are included in the present invention. Floppy disks, hard disks, semiconductor memory, CD-ROMs, DVDs, magneto-optical disks (MOs), and other computer-read/writeable recording media may be cited as examples in this respect.

Utilizing the present invention makes it possible to facilitate, among servers that provide information, the sharing of the information used.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. An information-sharing method comprising:
providinq a user terminal, which includes a qroup of information-acquisition devices that acquire information provided by a qroup of information-provision devices in communication with said user terminal;
acquiring, from a first information-acquisition device having acquired first information from a first information-provision device, said first information;
determining, by a router controller in the user terminal, a second information-acquisition device to be a sharing destination for said first information entirely or in part;
transferring said first information entirely or in part to said second information-acquisition device; and
uploading said first information from said second information-acquisition device to a second information-provision device; wherein
said first information-prevision device is included among said group of information-provision devices, and said first information-acquisition device and said second information-acquisition device are included among said group of information-acquisition devices, and
said user terminal includes an information-acquisition device corresponding to each information-provision device in communication with said user terminal.

2. The information-sharing method set forth in claim 1, further including:
detecting receipt of an instruction command, which instructs sharing of said first information, from said first information-acquisition device; wherein
if the instruction command has been detected, said determining determines a sharing rule for said first information, and determines said sharing destination in accordance with the determined sharing rule.

3. The information-sharing method set forth in claim 1, further including:
detecting the sending of an instruction command, which instructs sharing of said first information, out from said first information-acquisition device; wherein
said determining stores instruction commands, and sharing-rule identifiers corresponding to the instruction commands, and
if any one of the stored instruction commands has been detected, determines a sharing rule for the first information by retrieving from among the stored sharing-rule identifiers the sharing-rule identifier that corresponds to the detected instruction command, and determines said sharing destination in accordance with the sharing rule.

4. The information-sharing method set forth in claim 3, further including:
   demanding of a computer storing the instruction commands, and the sharing-rule identifiers corresponding to the instruction commands, the instruction commands and the sharing-rule identifiers; and
   acquiring from the computer said instruction commands and said sharing-rule identifiers.

5. The information-sharing method set forth in claim 1, wherein said transferring performs a process on said first information, and transfers to said second information-acquisition device, said processed first information entirely or in part.

6. An information-sharing device comprising:
   a group of information-acquisition devices that acquire information provided by a group of information-provision devices in communication with the information-sharing device;
   an acquireror acquiring, from a first information-acquisition device having acquired first information from a first information-provision device, said first information;
   a determiner determining a second information-acquisition device to be a sharing destination for said first information entirely or in part;
   a transferor transferring said first information entirely or in part to said second information-acquisition device; and
   an uploader uploading said first information from said second information-acquisition device to a second information-provision device; wherein
   said first information-provision device is included among said group of information-provision devices, and said first information-acquisition device and said second information-acquisition device are included among said group of information-acquisition devices, and
   said information-sharing device includes an information-acquisition device corresponding to each information-provision device in communication with said information-sharing device.

7. An apparatus comprising:
   a group of information-acquisition means, each corresponding to an information provider in a group of information provides in communication with the apparatus and acquiring information provided by the information provider;
   acquisition means for acquiring, from a first information-acquisition means having acquired first information from a first information provider, said first information;
   determination means for determining a second information-acquisition means to be a sharing destination for said first information entirely or in part;
   sharing means for transferring said first information entirely or in part to said second information-acquisition means; and
   uploading means for uploading said first information from said second information-acquisition means to a second information provider; wherein
   said first information provider is included among said group of information providers, and said first information-acquisition means and said second information-acquisition means are included among said group of information-acquisition means.

8. A computer-readable recording medium on which is recorded an information-sharing program for a computer which includes a group of information-acquisition devices that acquire information provided by a group of information-provision devices in communication with the computer, the information-sharing program causing the computer to execute:
   acquiring from a first information-acquisition device, included among said group of information-acquisition devices, that has acquired first information from a first information-provision device included among said group of information-provision devices, said first information;
   determining a second information-acquisition device, included among said group of information-acquisition devices, to be a sharing destination for said first information entirely or in part;
   transferring said first information entirely or in part to said second information-acquisition device; and
   uploading said first information from said second information-acquisition device to a second information-provision device,
   wherein said computer includes an information-acquisition devices corresponding to each information-provision device in communication with said computer.

9. A user-information administration method comprising:
   correlating and storing user-by-user an identifier for a first information-provision device that provides information to a user terminal, an identifier for a first information-acquisition device in the user terminal that corresponds with the first information-provision device and that acquires said information from said first information-provision device, an instruction command that instructs sharing of said information, and an identifier for a sharing rule for said information;
   transmitting, in response to a demand from the user terminal operated by a demand-source user, the identifier for the first information-provision device, the identifier for the first information-acquisition device, the instruction command, and the identifier for a sharing rule which correlate to the demand-source user;
   transferring said transmitted information to a second information-acquisition device in the user terminal, which corresponds to a second information-provision device; and
   uploading said transmitted information from said second information-acquisition device to the second information-provision device.

10. An information acquisition method utilized by a user terminal, the information acquisition method comprising:
    acquiring, by a first service controller in the user terminal, information from a first information-provision device, which corresponds to the first service controller, that provides information;
    installing on said user terminal an instruction command that instructs sharing of said information, and a sharing-rule identifier that corresponds to said instruction command;
    transferring said information entirely or in part to a second information-acquisition device in the user terminal, which corresponds to a second information-provision device; and
    uploading, by said second information-acquisition device, said shared information to said second information-provision device based on said sharing-rule identifier.

* * * * *

UNITED STATES PATENT AND TRADEMARK OFFICE
CERTIFICATE OF CORRECTION

PATENT NO. : 7,346,653 B2 Page 1 of 1
APPLICATION NO. : 10/355180
DATED : March 18, 2008
INVENTOR(S) : Kazuki Matsui et al.

It is certified that error appears in the above-identified patent and that said Letters Patent is hereby corrected as shown below:

Title Page, item [57] Column 2 (Abstract), Line 14, change "(Mesg2)" to --(Msg2)--.

Column 16, Line 20, change "providinq" to --providing--.

Column 16, Line 20, change "qroup" to --group--.

Column 16, Line 22, change "qroup" to --group--.

Column 16, Line 35, change "information-prevision" to --information-provision--.

Column 17, Line 19, change "acquireror" to --acquier--.

Signed and Sealed this

Twenty-sixth Day of August, 2008

JON W. DUDAS
*Director of the United States Patent and Trademark Office*